UNITED STATES PATENT OFFICE.

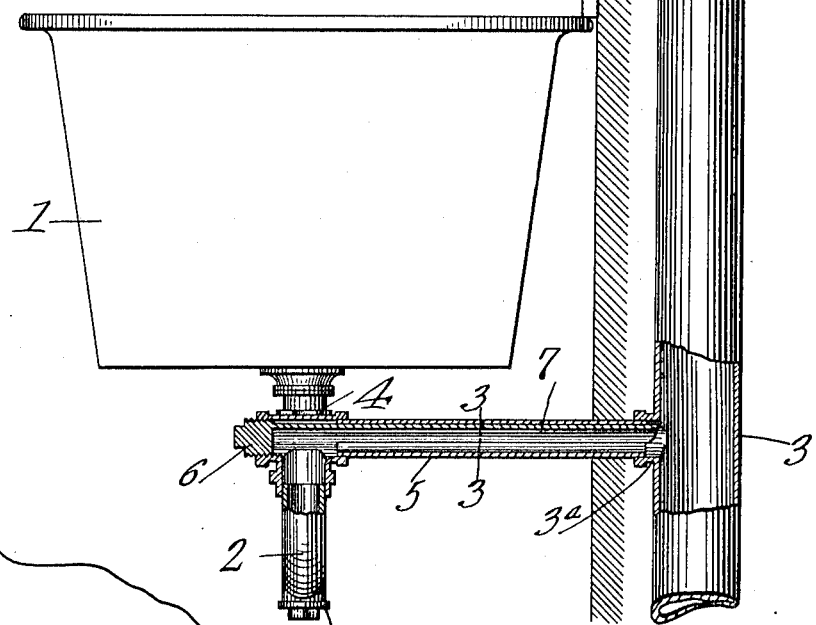

WILLIAM W. CALHOUN, OF NEW ORLEANS, LOUISIANA.

SANITARY PLUMBING-FIXTURE.

1,102,136.  Specification of Letters Patent.  Patented June 30, 1914.

Application filed March 6, 1914. Serial No. 822,964.

*To all whom it may concern:*

Be it known that I, WILLIAM W. CALHOUN, a citizen of the United States, residing at New Orleans, in the parish of Orleans and State of Louisiana, have invented a new and useful Sanitary Plumbing-Fixture, of which the following is a specification.

The present invention appertains generally to plumbing fixtures, and aims to provide a novel and improved clean-out fixture for sinks, and the like.

It is an object of the present invention to provide a unique discharge fixture for sinks, preferably culinary sinks, and the like, embodying means for cleaning out the accumulated greasy or extraneous matter, which not infrequently causes annoyance and expense in the use of the ordinary discharge traps or fixtures.

As a more specific object, the present invention comprehends the provision of a discharge fixture of the nature indicated, embodying a removable spoon or scoop assembled with the fixture in a novel manner, and so arranged as to cut or clear the congealed or accumulated matter from the discharge pipe of the fixture, by properly manipulating the spoon or scoop. It is also within the scope of the present invention to provide a fixture of the character indicated, which will be comparatively simple and inexpensive in construction, as well as being convenient, practical, serviceable and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is an elevation of a sink, illustrating the improved fixture applied thereto, portions being shown in section. Fig. 2 is a fragmental front view of the sink, illustrating the present fixture. Fig. 3 is an enlarged cross section, taken on the line 3—3 of Fig. 1.

In the drawing, there has been delineated a sink 1, having the discharge trap 2 attached to the bottom thereof, as usual, and arranged for connection with the usual upright soil pipe 3.

In carrying out the present invention, the trap 2, which is provided with the usual removable closure or plug 2' in its bottom or bend, is turned to one side, and to the free end of the trap 2, or that end which is not connected to the sink 1, is attached a T-coupling 4. The branch or lateral arm of the T-coupling 4 is engaged in any suitable manner to the free end of the trap 2, with the body portion of the coupling 4 disposed horizontally and in alinement with the inlet opening or port $3^a$ of the soil pipe 3.

A horizontal discharge pipe 5 has one end engaged to the opening $3^a$ of the soil pipe, and has its other or outer end engaged to the inner end of the coupling 4, to thereby connect the trap 2 with the soil pipe.

A plug or closure 6 is threaded or otherwise engaged into the other or outer end of the coupling 4, and is provided with an inwardly projecting elongated spoon or scoop 7 projecting therefrom. The spoon or scoop 7 is of arcuate or semi-circular cross section, and normally fits the top of the discharge pipe 5 snugly as seen in Figs. 1 and 3. It will thus be observed that the spoon or scoop 7 does not appreciably encumber the discharge pipe 5 of the coupling 4, in order that the water may readily pass from the sink 1 through the trap 2 and discharge pipe 5 to the soil pipe. The water or contents of the sink may thus readily pass through the fixture, without interference, and should the discharge pipe 5 become clogged with congealed or accumulated extraneous matter, the same may be readily freed or cleaned, by unscrewing or removing the plug 6, which will cause the spoon or scoop to shear the congealed or accumulated matter from the interior of the discharge pipe 5, and then, by bringing the spoon or scoop to the bottom of the pipe 5, and withdrawing the same, the loosened matter may be withdrawn from the pipe 5 and coupling 4. After the pipe 5 has been cleaned or cleared, the spoon or scoop may again be inserted into the pipe 5, so that the plug may be reëngaged to the coupling 4, for closing the coupling, in which event, the fixture will again be in condition for use. It is to be noted that the coupling 4 and pipe 5 being in alinement, and being disposed to one side of the body of the trap 2, will permit ready access to be had to the interior of the pipe 5, by removing the plug or closure 6. The several advantages and attributes of the present fixture will be obvious from the foregoing, taken in connection with the drawing, it being noted that the objects aimed at have been carried out satisfactorily.

Having thus described the invention, what is claimed as new is:—

1. A plumbing fixture embodying a discharge pipe, a trap having one end connected to the discharge pipe, a removable closure attached to one end of the said pipe and having an elongated scoop projecting into and fitting against one wall of said pipe.

2. A plumbing fixture embodying a discharge pipe, a T-coupling having one end engaged to one end of said pipe, and a closure detachably engaged to the other end of the said coupling, and having an elongated scoop projecting into the said pipe and fitting one wall thereof.

3. A plumbing fixture embodying a discharge pipe, a T-coupling having one end engaged to one end of the said pipe, a trap having one end engaged to the branch of the said coupling, and a plug inserted into the other end of the coupling, the plug having an elongated transversely-curved scoop projecting through the coupling and pipe and normally snugly fitting the top of the pipe.

In testimony that I claim the foregoing as my own, I have hereto affixed my signature in the presence of two witnesses.

WILLIAM W. CALHOUN.

Witnesses:
 JAS. G. SUARBRICK,
 ANDREW HEW.

---

Copies of this patent may be obtained for five cents each, by addressing the "Commissioner of Patents, Washington, D. C."